Jan. 23, 1968    J. E. PLEASANTS    3,364,631
INFLATABLE SUPPORT STRUCTURE
Filed Jan. 13, 1965    2 Sheets-Sheet 1

INVENTOR
JAMES E. PLEASANTS

BY
Gordon McBride
ATTORNEYS

Jan. 23, 1968   J. E. PLEASANTS   3,364,631
INFLATABLE SUPPORT STRUCTURE
Filed Jan. 13, 1965   2 Sheets-Sheet 2

INVENTOR
JAMES E. PLEASANTS

BY

ATTORNEYS

United States Patent Office 3,364,631
Patented Jan. 23, 1968

3,364,631
INFLATABLE SUPPORT STRUCTURE
James E. Pleasants, Hampton, Va., assignor to the United
States of America as represented by the Administrator
of the National Aeronautics and Space Administration
Filed Jan. 13, 1965, Ser. No. 425,365
7 Claims. (Cl. 52—2)

ABSTRACT OF THE DISCLOSURE

A beam of substantially circular cross section which has a linear edge and an opposite edge conforming to the moment curve of the loads to be supported to thereby form a cantilever beam of substantially semiconoidal configuration. The beam is preferably formed from a plastics material which may be sealed to a support and inflated by a gas. A platform utilizing a plurality of the semiconoidal beams for support of panels, all of which are inflatable.

---

The invention described herein may be manufactured and used by or for the Government of the United States of America for governmental purposes without the payment of any royalties thereon or therefor.

This invention relates generally to support structures and more particularly to a constant strength pneumatic cantilever beam.

Technological advances and ease of transportation over the past few years have brought about the need for portable structures. These structures necessarily must be lightweight and are preferably capable of folding or being packaged into extremely small containers. However, sufficient structural strength and support must be provided to withstand the forces encountered. In order to provide the structural rigidity necessary for portable structures, many materials, such as aluminum and plastics, have been developed and attempts made to utilize them for supporting the portable structure or at least acting as a framework about which other materials may be mounted. For construction of such portable devices from the known materials, it has become necessary to provide mechanical means, such as hinges or pivots, in order to permit a folding or collapsing of these structures. Another solution that has been proposed is the use of inflatable materials, for example plastics or coated cloth materials. However, in order to provide sufficient structural strength, it is necessary to increase the size which inherently increases the weight of the structure. With the increased efforts for exploration of areas hundreds of miles from the surface of the earth, there has become an increased need for packageable structures that are extremely lightweight. Hence, it is obvious that there is a need for extremely lightweight support elements that may be packaged into miniature containers to be transported hundreds of miles to the locality in which they are to be utilized. Such structures must be reliable and permit ease of construction and handling.

The present invention provides the above discussed advantages and requirements by utilizing a constant strength pneumatic cantilever beam.

It is an object of the instant invention to provide a lightweight beam of minimum surface area.

Another object of this invention is to provide a pneumatic cantilever beam of minimum surface area.

A further object of this invention is to provide a constant strength pneumatic cantilever beam.

Still another object of the instant invention is to provide a reliable constant strength beam of semiconoidal configuration.

A still further object of this invention is to provide an inflatable structure for use in low vacuum environments.

Still another object of the instant invention is to provide a lightweight pneumatic platform utilizing constant strength beams.

Generally, the foregoing and other objects are accomplished by forming a beam of substantially circular cross-section which has a linear edge and another opposite edge conforming to the moment curve of the loads to be supported to thereby form a cantilever beam of substantially semiconoidal configuration. The beam is preferably formed from a plastics material which may be sealed to a support, for example a wall, both of which are capable of inflation by a gas.

A more complete appreciation of the invention and many of the attendant advantages thereof will be readily apparent as the same becomes better understood by reference to the following description when considered in connection with the accompanying drawings wherein.

Figure 1:
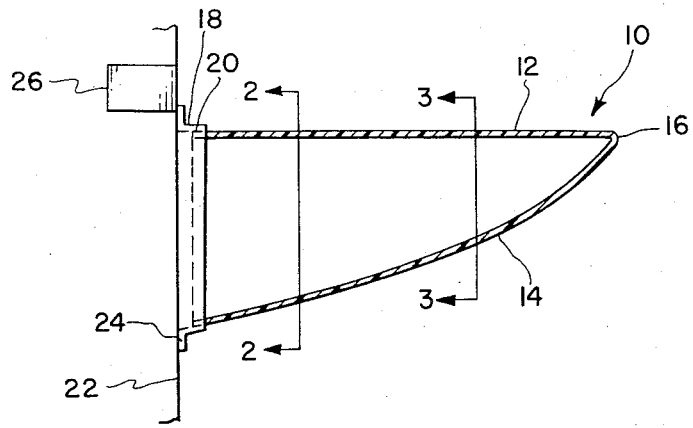
FIG. 1 is a cross-sectional elevational view of a beam of the instant invention.
Figure 2:
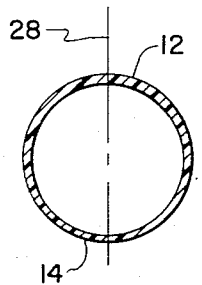
FIG. 2 is a cross-section taken on line 2—2 of FIG. 1.
Figure 3:
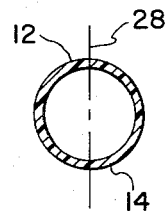
FIG. 3 is a cross-section taken on line 3—3 of FIG. 1.
Figure 4:
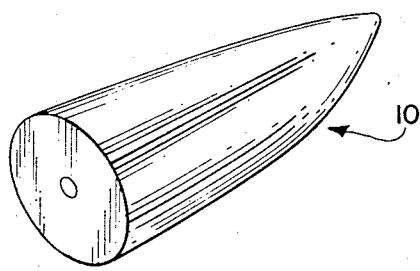
FIG. 4 is an isometric view of a beam of the instant invention.

Referring now to the drawing wherein like reference numerals designate identical or corresponding parts throughout the several views and more particularly to FIG. 1 wherein a beam, generally designated by reference numeral 10, is shown as having a substantially linear upper edge 12 and arched lower edge portion 14 that meet to form apex 16. As is evident from FIGS. 2–4, beam 10 has a substantially circular cross-section and in view of the linear upper edge 12 and arced lower edge 14 a beam of semiconoidal configuration results. The open end of tube beam 10 is sealed by end cover 18 which may extend across the end as well as around a portion of the tubular section and is hermetically sealed or glued at 20 thereto. End cover 18 is mounted or attached to a fixed wall or frame member 22 by hermetically sealing or gluing at 24. Beam 10 is formed of a flexible airtight material such as Mylar or plastics. In view of the circular cross-section of the tube 10, it is apparent that the beam is symmetrical about centerline 28, see FIGS. 2 and 3.

The cross-section of beam 10 in elevation, FIG. 1, shows arced lower edge 14 as it would apply to a definite moment curve. Because lower edge 14 conforms to the moment curve of all loads which are to be supported by beam 10, there is provided a cantilever beam of constant strength. In this regard, it may be well to note that lower edge 14 would conform to the moment curve $M_{TS}$ which is equal to $M_C + M_{TM} + M_G$ where $M_{TS}$ designates the total static bending moment, $M_C$ is the moment due to the constant load, $M_G$ stands for the moment due to the inflation gas and $M_{TM}$ designates the moment due to the material from which the tube is constructed. By utilizing a circular cross-section in conjunction with the tube lower edge conforming to the moment curve of the loads to be supported by the beam, beam 10 has a constant strength from the base adjacent end cover 18 to apex 16. Further, the beam is of minimum surface area and thereby is less susceptible to damage and considerably lighter in weight. In fact, in certain instances, it has been found that by beam 10 having the configuration of the instant invention there is a weight saving of from 55 to 60 percent over a conventional cylindrical beam.

In order to fully utilize the concept of a lightweight constant strength beam that is portable, a gas generator or source of gas 26 is mounted on or within framework or support 22. Thus, it is seen that beam 10 and support 22 may be folded into a small area and located within a container to provide easy transportation from one location to another. When installation or construction is desired, it is merely necessary to remove the folded structure from the container and activate gas generator or gas source 26 to inflate frame 22 and beam 10.

Figure 5:
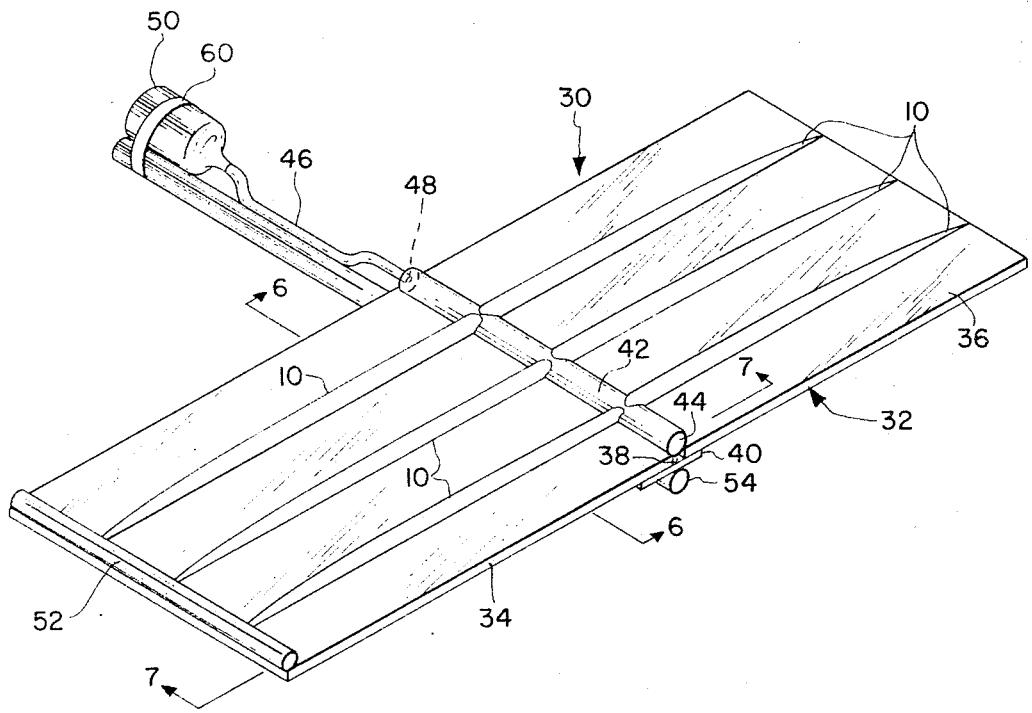
FIG. 5 is a support structure incorporating the instant inventive beam.
Figure 6:
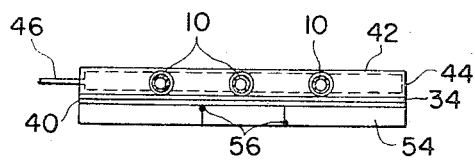
FIG. 6 is a cross-sectional view taken on line 6—6 of FIG. 5.
Figure 7:
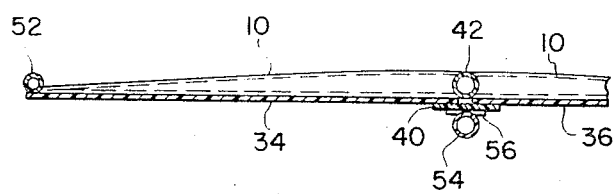
FIG. 7 is a cross-sectional view taken on line 7—7 of FIG. 5.

Referring now to FIGS. 5–7 wherein is shown a structure incorporating the novel beam of the instant invention. Inflatable structure or platform 30 includes panel 32 having a pair of inflatable sections 34 and 36. Panel sections 34 and 36 are shown as spaced at 38 to isolate them from one another, but if separation is unnecessary they may be joined along their adjacent edges. In order to insure sufficient strength and maintain space 38 uniform, reinforcement plate 40 extends across the ends of sections 34 and 36 to which it is rigidly secured. Tube or conduit 42 is mounted centrally of reinforcement plate 40 on the opposite side of panel 32 and is closed by end plate 44 at one end and end plate 48 at the other end. Gas hose 46 is secured to end plate 48 at one end and extends to a gas source 50 at the other end. Beams 10 are attached along their linear edge 12 to panels 34 and 36 and to conduit 42 by end cover 18. Beams 10 are in communication with conduit 42 that permits gas from source 50 to inflate both beams 10 and panel sections 34 and 36. To provide for packaging inflatable structure 30 into a small container, panel 32, conduit 42 and beams 10, as well as reinforcement plate 40, are made from a flexible lightweight material such as Mylar or plastics. It is to be understood that panel sections 34 and 36 are not necessarily inflatable and could be made from single or multiple ply material. In such a situation it would be advisable to support the ends of panel 32 with inflatable cross member 52 which would derive the necessary gas supply from beam 10.

Reinforcement tube 54 is secured to plate 40 and is preferably made of aluminum. As shown more clearly in FIG. 5, tube 54 extends beyond one edge of panel 32 to act as a support for gas source 50 which is secured thereto by clamp 60. Depending upon size limitations, tube 54 could utilize hinges 56 in order to provide an even smaller and more compact unit.

Inflatable structure 30 is capable of a multitude of uses in space exploration; for example, as a micrometeoroid sensor where conventional sensing instrumentation would be applied to panel 32 or as a platform for supporting any of a multitude of devices for collecting data. These uses, as well as for conventional structures, are accomplished by rolling sections 34 and 36 about themselves up to conduit 42 and tube 54 which would then be folded about hinges 56 to form a small compact unit. Once structure 30 has been conveyed to the location at which it is to be erected and used, it is merely necessary to release gas from gas source 50. The gas flows through hose 46 into conduit 42 from which it enters beams 10 and panel sections 34 and 36 or cross member 52. As the gas enters panel sections 34 and 36 and beams 10, it causes them to unroll and take on the configuration shown in FIG. 5.

Accordingly, it is apparent that the constant strength pneumatic cantilever beam of the instant invention provides a lightweight support element having a minimum surface area and which may be packaged into an extremely small unit for transportation from one location to another.

Obviously, many modifications and variations of the subject invention are possible in light of the above teachings. It is therefore to be understood that within the scope of the appended claims the invention may be practiced otherwise than as specifically described.

What is claimed as new and desired to be secured by Letters Patent of the United States is:

1. A portable platform comprising: a panel; an elongated reinforcing plate extending across one side of said panel substantially centrally thereof; a conduit secured to the opposite side of said panel and extending substantially parallel to said plate; and a plurality of constant strength cantilever beams extending from said conduit in supporting position to said panel whereby the platform may be collapsed and packaged into a compact unit which upon application of inflation gases expands itself into a substantially rigid lightweight structure.

2. The portable platform of claim 1 wherein an inflatable cross member communicates with said beams; said cross member attached to said panel and extending across the ends thereof.

3. The portable platform of claim 1 wherein said panel is inflatable.

4. The portable platform of claim 3 wherein a reinforcing tube is attached to said reinforcing plate.

5. The portable platform of claim 4 wherein said reinforcing tube is comprised of a plurality of sections hinged together whereby said tube may be collapsed and expanded with the remainder of the platform.

6. The portable penumatic platform of claim 4 comprising inflation means for inflating and expanding the platform.

7. A constant strength load-carrying beam comprising: a generally tubular member constructed of a flexible material, said tubular member being of circular cross-section, and having an upper linear edge and a lower curvilinear edge; a fluid contained within the member; and means sealing said fluid within said member, whereby an inflatable beam of minimum surface area and vulnerability to puncture is provided.

References Cited

UNITED STATES PATENTS

| | | | |
|---|---|---|---|
| 1,250,003 | 12/1917 | Schnabel | 52—73 X |
| 1,499,458 | 7/1924 | Hughes. | |
| 2,679,256 | 5/1954 | Bocchino et al. | 135—20 |
| 3,266,458 | 8/1966 | Ahlquist | 52—2 X |

FOREIGN PATENTS

| | | |
|---|---|---|
| 639,062 | 3/1962 | Canada. |
| 772,009 | 4/1957 | Great Britain. |

HENRY C. SUTHERLAND, *Primary Examiner.*

FRANK L. ABBOTT, *Examiner.*

G. W. HORNADAY, *Assistant Examiner.*